US008314579B2

(12) United States Patent
Nishimura et al.

(10) Patent No.: US 8,314,579 B2
(45) Date of Patent: Nov. 20, 2012

(54) SENSORLESS MOTOR CONTROL DEVICE

(75) Inventors: Keisuke Nishimura, Anjo (JP); Zhiqian Chen, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 418 days.

(21) Appl. No.: 12/591,928

(22) Filed: Dec. 4, 2009

(65) Prior Publication Data

US 2010/0156334 A1 Jun. 24, 2010

(30) Foreign Application Priority Data

Dec. 24, 2008 (JP) ................................ 2008-327239

(51) Int. Cl.
H02K 29/06 (2006.01)
H02P 6/00 (2006.01)
(52) U.S. Cl. ......... 318/400.32; 318/400.02; 318/400.35; 318/700
(58) Field of Classification Search ............. 318/400.32, 318/400.02, 400.35, 700
See application file for complete search history.

(56) References Cited

U.S. PATENT DOCUMENTS

| 7,245,104 B2 * | 7/2007 | Tomigashi et al. ............ 318/705 |
| 8,044,622 B2 * | 10/2011 | Yasui ...................... 318/400.32 |
| 2009/0200974 A1 | 8/2009 | Yasui |

FOREIGN PATENT DOCUMENTS

| JP | A 11-299299 | 10/1999 |
| JP | A 2003-18881 | 1/2003 |
| JP | A 2005-151640 | 6/2005 |
| JP | A 2007-236105 | 9/2007 |
| JP | A 2008-17608 | 1/2008 |

OTHER PUBLICATIONS

International Search Report mailed Mar. 2, 2010 for PCT/JP2009/069869.
Linke, Marco,"Injection of alternating carrier signals for sensorless control of induction machines," Fortschritt-Berichte-VDI Reihe 21 Nr. 349, VDI Verlag 2003, Seiten V bis VII, sowie 71.
Office Action issued in German Application No. 11 2009 001 975.7 dated Jun. 20, 2012 (with translation).

* cited by examiner

*Primary Examiner* — Walter Benson
*Assistant Examiner* — Erick Glass
(74) *Attorney, Agent, or Firm* — Oliff & Berridge, PLC

(57) ABSTRACT

A sensorless motor control device includes a magnetic pole position estimating unit that does not use a sensor to detect a magnetic pole position of a motor having a salient rotor, and overlays a high-frequency current on the motor to estimate the magnetic pole position of the rotor of the motor; and a high-frequency current control unit for changing a magnitude of the high-frequency current based on a magnitude of one of a torque and a current of the motor.

3 Claims, 5 Drawing Sheets

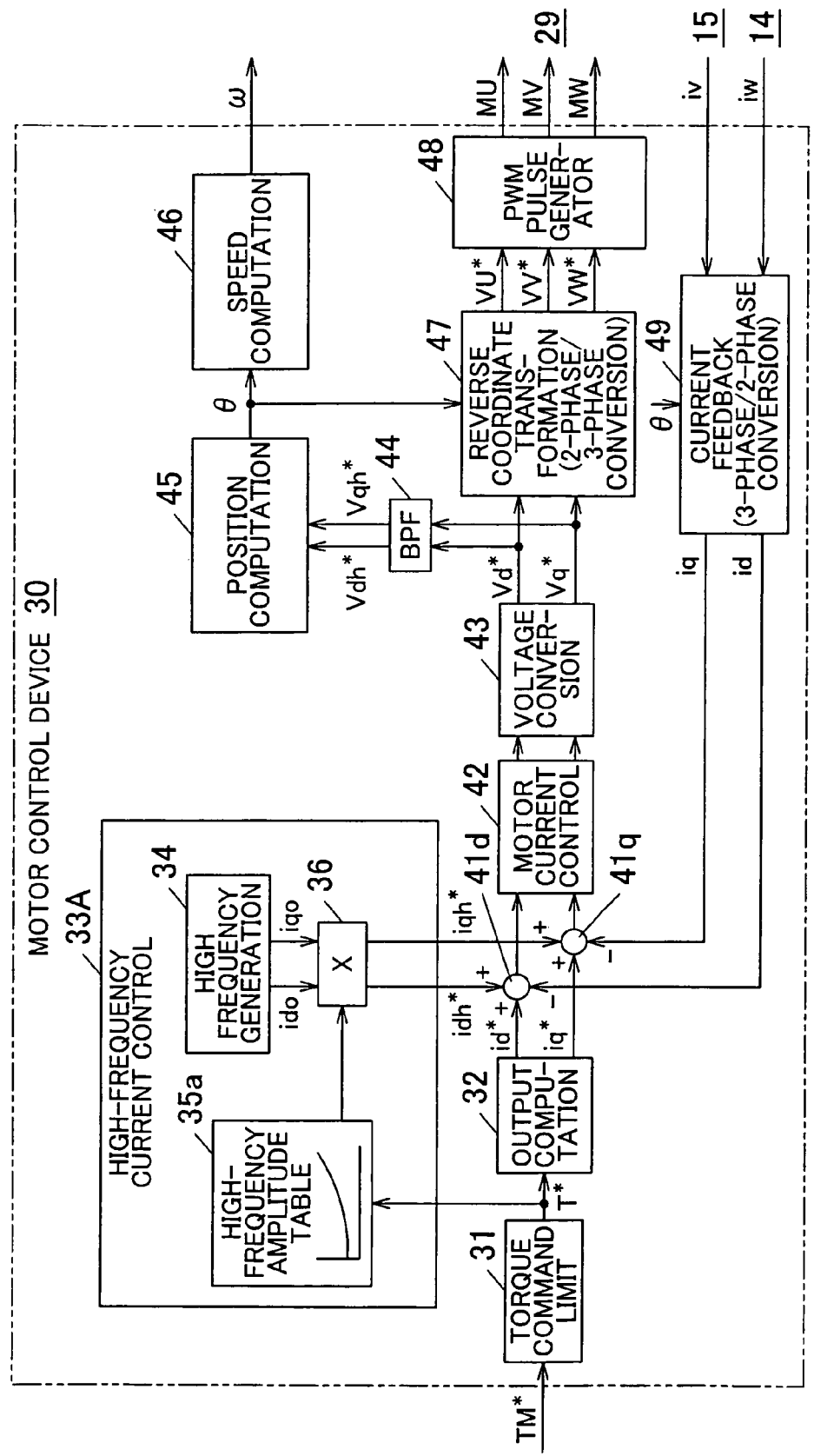
F I G . 2

SENSORLESS MOTOR CONTROL DEVICE

CROSS-REFERENCE TO RELATED APPLICATION

The disclosure of Japanese Patent Application No. 2008-327239 filed on Dec. 24, 2008 including the specification, drawings and abstract is incorporated herein by reference in its entirety.

BACKGROUND

The present invention relates to a drive control device for a motor, and specifically relates to a sensorless vector control device that calculates a position angle of a rotor based on a high-frequency current and a high-frequency voltage running through the motor for use as a position angle in a vector control computation. The sensorless motor control device of the present invention may be used, for example, in an electric vehicle (EV) that uses a motor to drive the wheels, as well as a hybrid electric vehicle (HEV) having a motor whose battery is recharged by driving the engine.

In Japanese Patent Application Publication No. JP-A-H11-299299, a harmonic current generated by a harmonic current generator 10 is overlaid on (added to) id of target currents id, iq on two axes of a motor vector control. A motor voltage is detected and a q-axis voltage is calculated from the voltage, and then differentiated. A positional error detector 15 calculates a positional error, after which a position angle of a targeted gap magnetic flux is calculated. In Japanese Patent Application Publication No. JP-A-2007-236015, an induced voltage of a motor is calculated based on a d-axis voltage command of a motor vector control, and d-axis and q-axis currents of the motor. A position computation then calculates a position angle θ based on the induced voltage.

SUMMARY

The position angle calculation using a high frequency focuses on orthogonal biaxial inductances Ld, Lq. However, power loss occurs in the motor due to the high-frequency current injected to the motor or the harmonic component in the motor current, and generates noise. In light of this, reducing the high-frequency current or the harmonic current is desirable, but a reduction would lower the S/N ratio in the Ld, Lq calculations and increase the error in the position angle calculation.

In small high-output motors often used as on-vehicle motors, higher torque (higher current) driving is accompanied by increased magnetic saturation, and reduces the saliency ratio (Lq/Ld) (the saliency ratio approaches 1), thus lowering the accuracy of the position angle calculation. In other words, as shown in FIG. 5, the orthogonal biaxial inductances Ld, Lq for the high-frequency current or the harmonic current are dynamic inductances that become the tangent angle of the I/φ curve of the stator. However, near the saturation region of the I/φ curve, that is, in the high torque (high current) region, Ld and Lq both approach zero and there is little change in Ld and Lq with respect to the high-low variation of a current I. This lowers the S/N ratio of the Ld, Lq calculation values based on the voltage and the high-frequency current or the harmonic current, which lowers the accuracy of the position angle calculation that uses Ld and Lq as parameters.

The present invention increases the accuracy of a position angle calculation ranging from a low torque (low current) to a high torque (high current), and suppresses power loss at low torque (low current).

(1) A sensorless motor control device includes a magnetic pole position estimating unit that does not use a sensor to detect a magnetic pole position of a motor having a salient rotor, and overlays a high-frequency current on the motor to estimate the magnetic pole position of the rotor of the motor. The sensorless motor control device further includes a high-frequency current control unit for changing a magnitude of the high-frequency current based on a magnitude of a torque or a current of the motor.

At a high torque with a large motor current value, the detection accuracy of the position angle deteriorates because of the small saliency ratio (Lq/Ld) caused by magnetic saturation. Conversely at a low torque with a small motor current value, the detection accuracy of the position angle can be secured because of the large saliency ratio (Lq/Ld). Therefore, based on the magnitude of the torque or current of the motor, the detection accuracy of the position angle can be improved while also suppressing power loss and noise, by changing the magnitude of the high-frequency or harmonic current used in the position angle calculation.

(2) In the sensorless motor control device according to (1) above, the high-frequency current control unit increases the high-frequency current in accordance with a larger magnitude of the torque or the current of the motor, and decreases the high-frequency current in accordance with a smaller magnitude of the torque or the current of the motor.

At a high torque with a large motor current value, power loss and noise increase due to the increased high-frequency or harmonic current used in the position angle calculation; however, the accuracy of the position angle calculation can be improved. Conversely at a low torque with a small motor current value, the detection accuracy of the position angle can be secured even with a reduced high-frequency or harmonic current, so power loss and noise can also be reduced.

(3) In the sensorless motor control device (FIGS. 2 to 4) according to (2) above, the high-frequency current control unit includes a high-frequency generating unit for generating a high-frequency current signal; a table that is a collection of current level specification data that correspond to each value of the torque or the current of the motor; and a unit for generating the high-frequency current by amplifying the high-frequency current signal to a level specified by the current level specification data in the table that corresponds to the present torque or current.

Accordingly, the current level specification data can be acquired by accessing the table, and the high-frequency current can be easily generated.

(4) In the sensorless motor control device (FIGS. 2, 4) according to (3) above, the current level specification data in the table is amplitude specification data, and the high-frequency current control unit generates a high-frequency current command value by amplifying an amplitude of the high-frequency current signal to an amplitude specified by the amplitude specification data.

Accordingly, the current level specification data can be acquired by accessing the table, and the high-frequency current command value can be easily generated.

(5) In the sensorless motor control device (FIGS. 3, 5) according to (3) above, the current level specification data in the table is gain specification data, and the high-frequency current control unit generates a high-frequency current command value by amplifying the high-frequency current signal using a gain specified by the gain specification data.

(6) In the sensorless motor control device (FIG. 2) according to any one of (3) to (5) above, the table is a collection of current level specification data that corresponds to each value of a target torque.

(7) In the sensorless motor control device (FIG. 3) according to any one of (3) to (5) above, the table is a collection of current level specification data that corresponds to each value of an orthogonal biaxial target current.

(8) In the sensorless motor control device (FIG. 4) according to any one of (3) to (5) above, the table is a collection of current level specification data that corresponds to each value of an orthogonal biaxial feedback current.

BRIEF DESCRIPTION OF THE DRAWINGS

FIG. 2 is a block diagram that shows a functional configuration according to the first embodiment of a motor control device 30 shown in FIG. 1;

DETAILED DESCRIPTION OF EMBODIMENTS

Other objects and characteristics of the present invention will become clear from the embodiments described below with reference to the accompanying drawings.

First Embodiment

Figure 1:
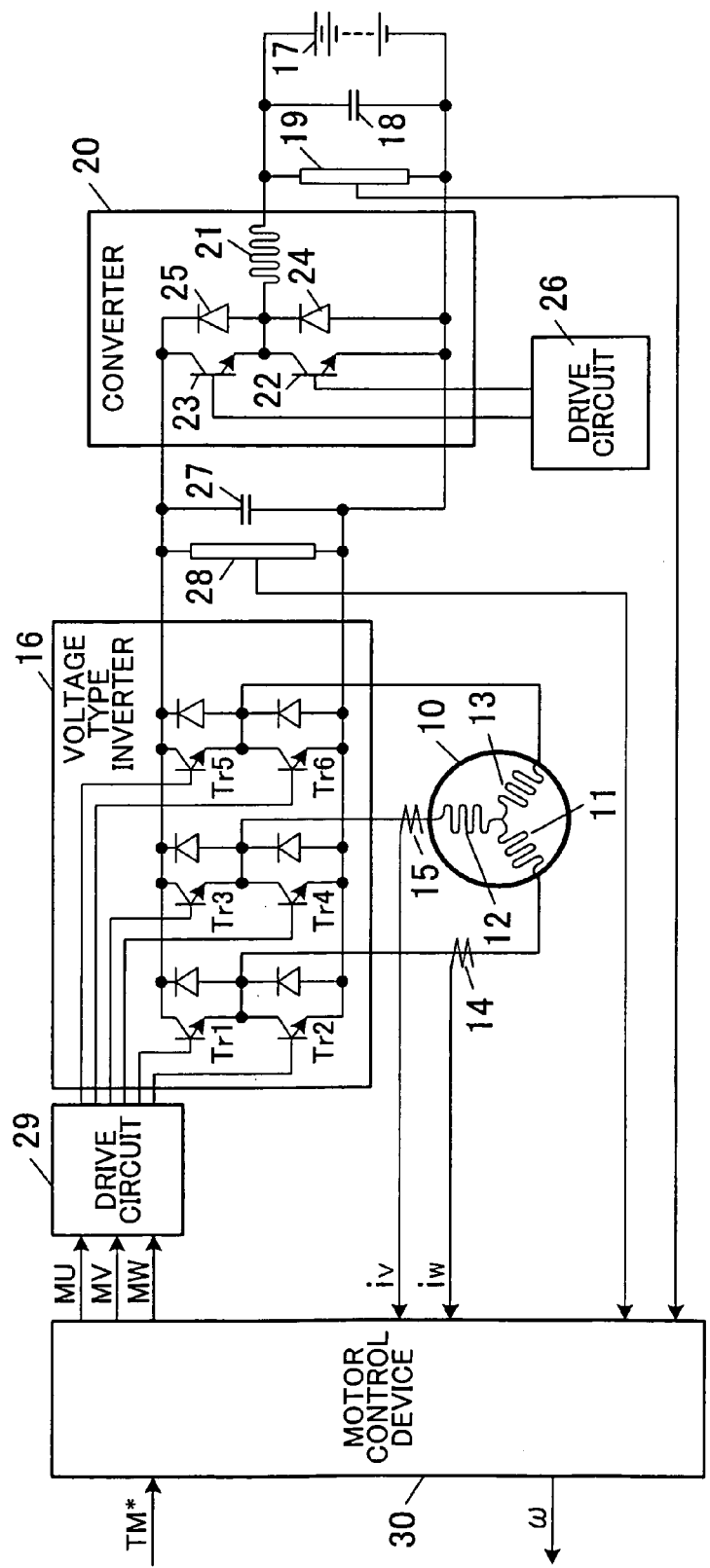
FIG. 1 is a block diagram that shows a constitution of an electrical system of a wheel drive apparatus according to a first embodiment of the present invention.

FIG. 1 shows an outline of a first embodiment according to the present invention. In this embodiment, an electric motor 10 to be controlled is installed in a vehicle and is a synchronous motor with embedded permanent magnets for rotationally driving a wheel. The permanent magnets are built into a rotor, and a stator has coils 11 to 13 of the three phases, U, V, and W. A voltage type inverter 16 supplies the electric motor 10 with power from an on-vehicle battery 17.

The battery 17 is an accumulator in the vehicle and connects to a primary-side condenser 18 when an electric component in the vehicle is turned on. Together with the battery 17, the primary-side condenser 18 forms a primary-side DC power supply. A voltage sensor 19 sends a voltage detection signal Vdc representing the voltage of the primary-side condenser 18 (voltage of the on-vehicle battery 17) to a motor control device 30. In this embodiment, partial pressure resistance is used in the voltage sensor 19. The positive electrode (+ line) of the primary-side DC power supply is connected to an end of a reactor 21 of a converter 20.

The converter 20 further includes a pressure-increasing semiconductor switch 22, which is a switching element for increasing pressure, that switches on and off between another end of the reactor 21 and the negative electrode (− line) of the primary-side DC power supply; a regenerative semiconductor switch 23, which is a switching element for regeneration, that switches on and off between the other end of the reactor 21 and the positive electrode of a secondary-side condenser 27; and diodes 24, 25 that are connected in parallel to the respective semiconductor switches 22, 23.

If the pressure-increasing semiconductor switch 22 is turned on (conductive), current flows from the primary-side DC power supply (17, 18) to the switch 22 through the reactor 21, and the reactor 21 accumulates power accordingly. If the switch 22 is turned off (non-conductive), the reactor 21 sends a high-pressure discharge to the secondary-side condenser 27 through the diode 25. In other words, a higher voltage than the voltage of the primary-side DC power supply is induced to charge the secondary-side condenser 27. Repeatedly turning the switch 22 on and off enables continued high-pressure charging of the secondary-side condenser 27. That is, the secondary-side condenser 27 is charged at a high voltage. Repeatedly switching between on and off in regular cycles increases the power accumulated by the reactor 21 depending on the length of the on period. Therefore, by adjusting the on time in a regular cycle (on-duty: ratio of the on time to the regular cycle), namely by performing a PWM control, the speed at which power is fed (feeding speed for power running) from the primary-side DC power supply 17, 18 to the secondary-side condenser 27 through the converter 20 can be adjusted.

If the regenerative semiconductor switch 23 is turned on (conductive), the accumulated power of the secondary-side condenser 27 is sent to the primary-side DC power supply 17, 18 through the switch 23 and the reactor 21 (reverse power supply: regeneration). In this case as well, by adjusting the on time of the switch 23 in a regular cycle, namely by performing a PWM control, the speed at which power is reverse-fed (feeding speed for regeneration) from the secondary-side condenser 27 to the primary-side DC power supply 17, 18 through the converter 20 can be adjusted.

The voltage type inverter 16 includes six switching transistors Tr1 to Tr6. The transistors Tr1 to Tr6 are driven on (conductive) based on six drive signals generated in parallel by a drive circuit 29. The DC voltage of the secondary-side condenser 27 (output voltage of the converter 20, i.e., secondary voltage) is converted into three AC voltages whose phase difference is 2π/3, namely a three-phase AC voltage, and respectively applied to the three-phase (U-phase, V-phase, W-phase) stator coils 11 to 13 of the electric motor 10. Thus, phase currents iU, iV, iW respectively flow to the stator coils 11 to 13 of the electric motor 10, and rotate the rotor of the electric motor 10. In order to increase the power supply performance for driving on and off (switching) the transistors Tr1 to Tr6 using a PWM pulse and suppress voltage surges, the secondary-side output line of the converter 20, which is the input line of the inverter 16, is connected to the high-capacity secondary-side condenser 27. On the contrary, the primary-side condenser 18 forming the primary-side DC power supply is small, low-cost, and low-capacity. The capacity of the primary-side condenser 18 is considerably smaller than the capacity of the secondary-side condenser 27. The voltage sensor 28 detects a secondary voltage Vuc of the converter 20 and sends the detection result to the motor control device 30. The supply power line connected to the stator coils 11, 12 of the electric motor 10 is mounted with current sensors 14, 15 that use a hall IC. The current sensors 14, 15 respectively detect the phase currents iV, iW, and generate current detection signals (analog voltage) that are sent to the motor control device 30.

FIG. 2 shows a functional configuration of the motor control device 30. In the present embodiment, the motor control device 30 is an electronic control unit whose main body consists of a digital signal processor (DSP). The motor control device 30 includes interfaces (signal processing circuits) not shown in the drawing between itself and the drive circuit 29, the current sensors 14, 15, the primary voltage sensor 19, and the secondary voltage sensor 28, and further includes interfaces (communication circuits) not shown in the drawing between itself and a main controller of a vehicle running control system (not shown) in the vehicle.

Referring to FIG. 2, a position computation unit 45 calculates a rotation angle (magnetic pole position) θ of the rotor of the electric motor 10, and a speed computation unit 46 calculates a rotation speed (angular speed) ω based on the rotation angle θ. To be more precise, the rotation angle and magnetic pole position of the rotor of the electric motor 10 are not the same; however, the two have a proportional relationship and the proportionality coefficient is determined by a magnetic pole number p of the electric motor 10. Furthermore, although the rotation angle and the angular speed are not the same, the two have a proportional relationship and the proportionality coefficient is determined by the magnetic pole number p of the electric motor 10. In the present specification, the rotation angle θ refers to the magnetic pole position. The rotation speed ω refers to the angular speed, and may also refer to the rotation speed.

The main controller of the vehicle running control system (not shown) sends a motor target torque TM* to a control device 30 of the motor control device 30. Note that the main controller calculates a vehicle required torque TO* based on the vehicle speed and the throttle opening, generates the motor target torque TM* corresponding to the vehicle required torque TO*, and then sends the motor target torque TM* to the control device 30. The control device 30 outputs a rotation speed ω [rpm] of the electric motor 10 to the main controller.

In accordance with a torque command limit 31, the motor control device 30 reads out from a limit torque table (look-up table) a limit torque TM*max that corresponds to the rotation speed ω and an upper limit Vmax of the output voltage (secondary voltage) of the converter 20. If the target torque TM* exceeds TM*max, TM*max is set as a target torque T*. If the target torque TM* is equal to or less than TM*max, the motor target torque TM* is set as the target torque T*. The motor target torque T* generated with such a limit added is sent to an output computation unit 32, and also used in a secondary target voltage calculation.

Note that the limit torque table is a memory region in which the upper limit Vmax of the secondary voltage and voltage values in the range of the rotation speed are written as addresses, and the maximum torque capable of activating the electric motor 10 at each voltage value is written as TM*max. In the present embodiment, the limit torque table refers to a memory region of a RAM (not shown) in the control device 30. The limit torque TM*max becomes larger as the upper limit Vmax of the secondary voltage increases, and smaller as the upper limit Vmax decreases. In addition, the limit torque TM*max becomes larger as the rotation speed ω decreases, and smaller as the rotation speed ω increases.

There is a nonvolatile memory inside the motor control device 30 that is written with the data TM*max of the limit torque table. When operating voltage is applied to the control device 30, the control device 30 reads out TM*max from the nonvolatile memory and writes TM*max to the RAM over the course of initializing itself and a motor drive system shown in FIG. 1. It will be noted later on that there are a plurality of other similar look-up tables in the control device 30. Like the limit torque table, these look-up tables also refer to memory regions on the RAM that are written with reference data in the nonvolatile memory.

The motor control device 30 determines whether power running or regeneration is to be performed based on the target torque T* and the rotation speed ω. The motor control device 30 reads out a secondary target voltage Vuc* assigned for the rotation speed ω of the electric motor 10 from a secondary target voltage table assigned for the target torque T* in a "power running" group if power running, and in a "regeneration" group if regeneration. The motor control device 30 then controls the converter 20 through the drive circuit 26 such that the secondary voltage detected by the sensor 28 matches the target voltage Vuc*.

Based on the output computation unit 32, a motor current control 42, and a voltage conversion unit 43, the motor control device 30 performs a feedback control of the motor current using a vector control computation on a conventional d-q axis model in which the d-axis is the direction of a pair of magnetic poles in the rotor of the electric motor 10 and the q-axis is the direction perpendicular to the d-axis. The control device 30 digitally converts and reads the current detection signals iV, iW from the current sensors 14, 15. In a current feedback computation unit 49, the control device 30 uses a three-phase/two-phase conversion, which is a conventional conversion of fixed coordinates into rotating coordinates, to transform the three-phase current values iU, iV, iW of a fixed coordinate system into two-phase current values id, iq for the d-axis and q-axis of a rotating coordinate system. Note that iU+iV+iW=0, and iU is calculated based on this assumption.

A first high-efficiency torque curve table A, which is a look-up table, is used in the output computation unit 32. The first high-efficiency torque curve table A is written with d-axis current values id that are linked to the motor speed ω and the motor target torque T*, and used to generate the target torques T* at each motor speed.

The output torque of the electric motor is set with respect to the values of the d-axis current id and the q-axis current iq. For one rotation speed, that is, at the same motor rotation speed, there are an infinite number of id, iq combinations for outputting the same torque, which are indicated on a constant torque curve. The id, iq combination with the highest efficiency of power use (least power consumption) on the constant torque curve is a high-efficiency torque point. A curve that connects the high-efficiency torque points on a plurality of torque curves is a high-efficiency torque curve that exists with respect to each rotation speed. The d-axis current id and the q-axis current iq for the position of the given motor target torque T* on the high-efficiency torque curve for the motor rotation speed are designated as target current values for biasing the electric motor 10. The electric motor 10 thus outputs the target torque T* and such biasing of the motor results in a highly efficient use of motor power.

In the present embodiment, the high-efficiency torque curve is divided into two systems: the first high-efficiency torque curve A representing d-axis values, and a second high-efficiency torque curve B representing q-axis values. Furthermore, the first high-efficiency torque curve A is a pair of curves, with one applicable to the power running region and one applicable to the regeneration region; both represent the d-axis target current with respect to the motor rotation speed and the target torque.

The first high-efficiency torque curve table A is a memory region written with the target torque T* linked to the d-axis target currents in order to generate the target torque using the least power consumption, and is formed from a pair consisting of a power running table A1 for power running and a regeneration table A2 for regeneration. To determine which of the power running and regeneration tables is used, it is first determined whether power running or regeneration is to be performed based on the rotation speed ω of the electric motor and the given target torque T*, and one of the tables is selected based on the determination result.

In a d-axis current command calculation within the output computation unit 32, the control device 30 subtracts a d-axis field weakening current Δid from the d-axis current value id, which is read out from the first high-efficiency torque curve table A corresponding to the target torque T* determined by the torque command limit 31. The control device 30 then calculates a d-axis target current id* as id*=−id−Δid.

A q-axis current command calculation uses the second high-efficiency torque curve table B that is in the output computation unit 32. The second high-efficiency torque curve table B corrects the second high-efficiency torque curve B representing the q-axis values on the high-efficiency torque curve to a curve representing the q-axis target current after subtracting a q-axis field weakening current Δiq paired with the d-axis field weakening current Δid. The second high-efficiency torque curve table B then stores the data of the corrected second high-efficiency torque curve B. The second high-efficiency torque curve table B is a memory region written with the d-axis target currents linked to the target torque T* and the d-axis field weakening current Δid in order to generate the target torque using the least power consumption, that is, the target current values on a corrected second high-efficiency torque curve B. The second high-efficiency torque curve table B is also formed from a pair consisting of a power running table B1 for power running and a regeneration table B2 for regeneration. To determine which of the power running and regeneration tables is used, it is first determined whether power running or regeneration is to be performed based on the rotation speed ω of the electric motor and the target torque T*, and one of the tables is selected based on the determination result.

In the q-axis current command calculation, a q-axis target current iq* designated for the target torque T* and the d-axis field weakening current Δid is read from the second high-efficiency torque curve table B and set as the q-axis current command.

In the motor current control 42, the motor control device 30 calculates a current difference δid between the d-axis target current id* and the d-axis current id, and a current difference δiq between the q-axis target current iq* and the q-axis current iq. A proportional control and integral control (PI computation of the feedback control) are performed based on the current differences δid, δiq. Based on such output, a d-axis voltage command value Vd* and a q-axis voltage command value Vq* are then calculated as output voltages in the voltage conversion unit 43.

Next in a two-phase/three-phase conversion unit 47, which performs a transformation of rotating coordinates into fixed coordinates, the target voltages Vd* and Vq* of a rotating coordinate system are transformed in accordance with the two-phase/three-phase conversion into three-phase target voltages VU*, VV*, VW* of a fixed coordinate system, and sent to a PWM pulse generator 48. When the voltage control mode is two-phase modulation, the target voltages Vd* and Vq* are modulated into two-phase target voltages and sent to the PWM pulse generator 48. When the PWM pulse generator 48 receives the phase target voltages, the PWM pulse generator 48 converts them into PWM pulses MU, MV, MW in order to output voltage at each target voltage value, and outputs the PWM pulses MU, MV, MW to the drive circuit 29 shown in FIG. 1. The drive circuit 29 generates six drive signals in parallel based on the PWM pulses MU, MV, MW, and the drive signals respectively turn on and off the transistors Tr1 to Tr6 of the voltage type inverter 16. Thus, the phase target voltages are respectively applied and the phase currents iU, iV, iW flow to the stator coils 11 to 13 of the electric motor 10. When the phase target voltages of the two-phase modulation mode are received, the PWM pulse generator generates PWM pulses for two phases and sets an on or off (constant voltage output) signal for the remaining phase. When the phase target voltages of a one-pulse modulation mode are received, an energization section signal that uses the phases for rectangular wave conduction is output.

Note that the field weakening current computation calculates a voltage saturation index m, which is a parameter used for a field weakening control. Namely, based on the d-axis voltage command value Vd* and the q-axis voltage command value Vq*, a voltage saturation calculation value ΔV is calculated as a value representing the degree of voltage saturation, and a field adjustment amount calculated. In the calculation of the field adjustment amount, if ΔV is integrated and an integrated value ΣΔV is positive, the integrated value ΣΔV is multiplied by the proportional coefficient to calculate the d-axis field weakening current Δid used in performing the field weakening control and set to a positive value. If the voltage saturation calculation value ΔV or the integrated value ΣΔV is zero or less, the adjustment value Δid and the integrated value ΣΔW are set to zero. The adjustment value Δid is used in the d-axis current command calculation and the q-axis current command calculation.

The position computation unit 45 calculates the rotation angle (magnetic pole position) θ of the rotor, i.e., a rotor position angle, using a position angle computation that uses the high-frequency-compatible orthogonal biaxial inductances Ld, Lq, based on high-frequency voltages Vdh*, Vqh* that are injected into (overlaid on) the three-phase current of the electric motor 10. The calculated position angle θ is used in the speed computation unit 46 for calculating the motor rotation speed ω, and also used for phase conversion in the two-phase/three-phase conversion unit 47 and the three-phase/two-phase conversion unit 49.

According to the present embodiment, in order to inject high-frequency current into the electric motor 10, high-frequency current commands idh*, iqh* are first generated at a low level for a low target torque (low current value) in a high-frequency current control 33A, and are increased to a higher level as the target torque increases. The high-frequency current commands idh*, iqh* are then added to the orthogonal biaxial target current values id*, iq* by addition-subtraction units 41d, 41q. Thus, the injected high-frequency-compatible high-frequency voltages Vdh*, Vqh* are included in the output of the voltage conversion unit 43. This is then extracted by a band pass filter 44. The high-frequency voltages Vdh*, Vqh* (instantaneous values) extracted by the band pass filter 44 are applied to the position computation unit 45, and the position computation unit 45 calculates and outputs the position angle θ corresponding to these values.

The high-frequency current control 33A of the present embodiment includes a high-frequency generation unit 34, which generates constant-amplitude current signals ido, iqo with a high frequency (500 Hz in the present example) for a pair of d-, q-axes, and also includes a high-frequency amplitude table (a data set in a region of the RAM) 35a, which uses the values of target torques as addresses and the high-frequency amplitudes linked to each target torque as current level specification data. A high-frequency amplitude (target amplitude) linked to the target torque T* is read out from the table 35a, and a multiplication (amplification) unit 36 amplifies the constant-amplification current signals ido, iqo to the target amplitude, and outputs these to the addition-subtraction units 41d, 41q.

The high-frequency amplitude table 35a is written with high-frequency amplitudes whose level is higher for higher target torque values and lower for lower target torque values. Therefore, the position angle computation at a high torque (high current) has greater accuracy, and there is less power loss at a low torque (low current).

Note that in a modification of the present embodiment, the data in the high-frequency amplitude table 35a may be an amplitude gain instead of the high-frequency amplitude. The constant-amplification current signals ido, iqo may be amplified using an amplitude gain read out from the table 35a and then output to the addition-subtraction units 41d, 41q. Likewise, an amplitude gain may also be used in modifications of second and third embodiments described next.

Second Embodiment

Figure 3:
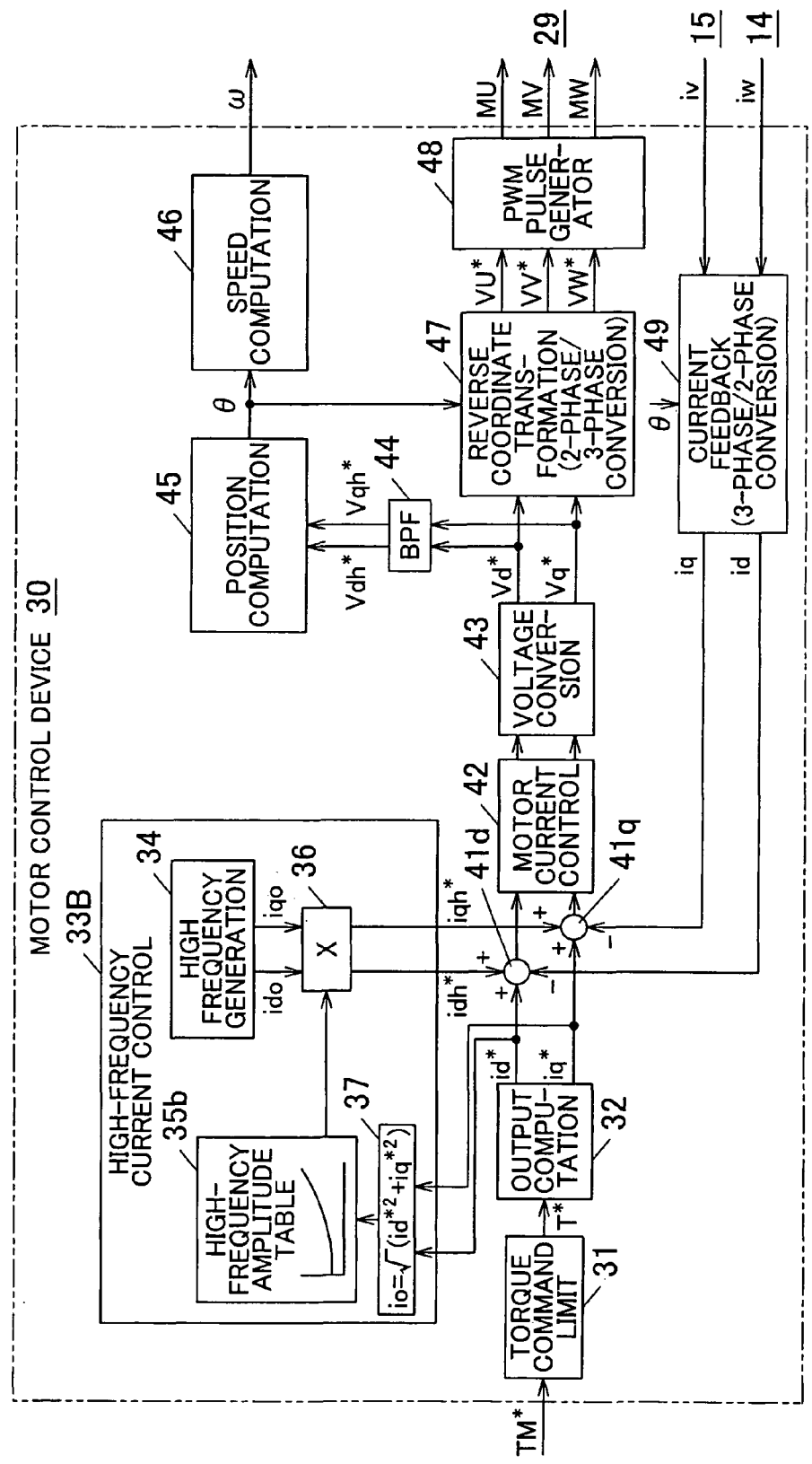
FIG. 3 is a block diagram that shows a functional configuration according to a second embodiment of the motor control device 30 shown in FIG. 1.

FIG. 3 shows a functional configuration of the motor control device 30 according to a second embodiment. In the second embodiment, the three-phase current of the motor is converted into the orthogonal biaxial d-axis current id and q-axis current iq in the three-phase/two-phase conversion unit 49, and a vector resultant value of id, iq, that is, a target current value io having orthogonal two-axis coordinates, is calculated by a vector computation unit 37. A table 35b uses the target current values io corresponding to the target torque T* as addresses and stores high-frequency amplitudes (target amplitudes) that are current level specification data. A high-frequency amplitude (target amplitude) linked to the current target current value io is read out from the table 35b, and the multiplication (amplification) unit 36 amplifies the constant-amplification current signals ido, iqo to the target amplitude, and then outputs these to the addition-subtraction units 41d, 41q. Other constitutions and functions of the second embodiment are identical to the first embodiment described above.

Third Embodiment

Figure 4:
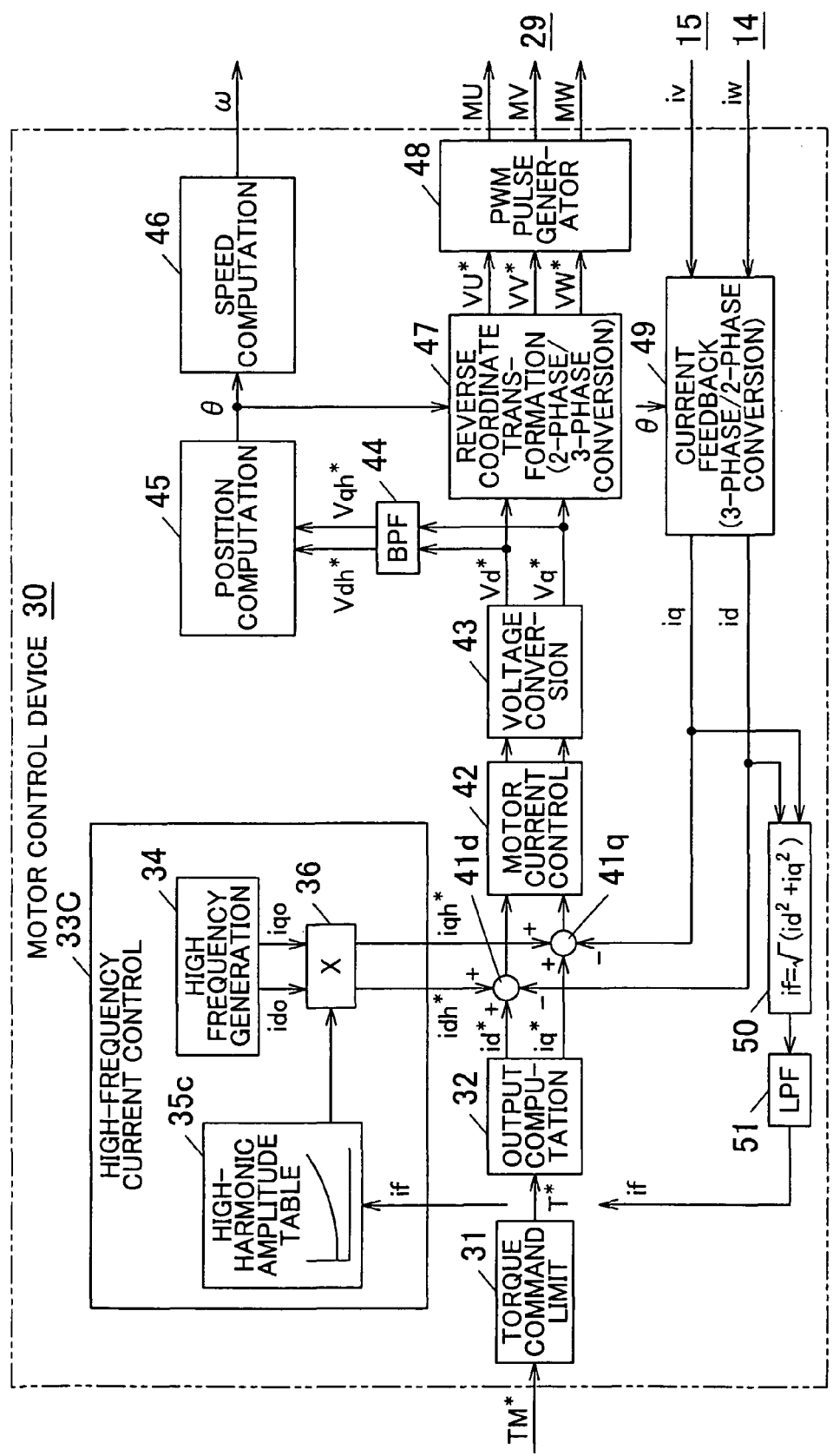
FIG. 4 is a block diagram that shows a functional configuration according to a third embodiment of the motor control device 30 shown in FIG. 1.
Figure 5:
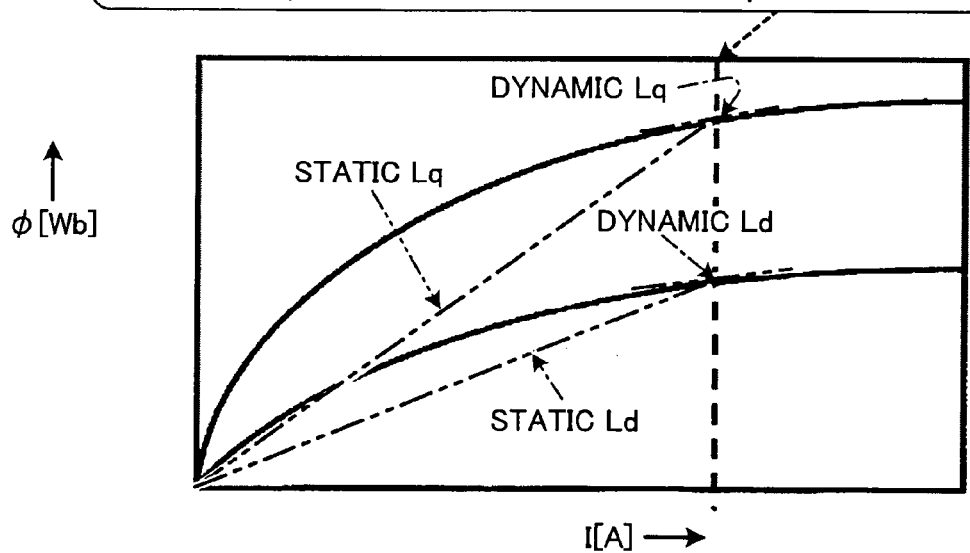
FIG. 5 is a graph that shows an outline of the relationship between magnetic flux and an energization current value of a stator in a synchronous motor with embedded permanent magnets.

FIG. 4 shows a functional configuration of the motor control device 30 according to a third embodiment. A table 35c of a high-frequency current control 33C uses motor current values (feedback values) as addresses and stores high-frequency amplitudes (target amplitudes) that are current level specification data. The three-phase current of the motor is converted by the current feedback computation (three-phase/two-phase conversion) unit 49 into the orthogonal biaxial values, d-axis current id and q-axis current iq. A vector resultant value of id, iq, that is, a motor current value (feedback current value) if having orthogonal two-axis coordinates, is calculated by a vector computation 50. The calculation value (instantaneous value) is smoothed (converted into DC) by a low-pass filter 51, and a high-frequency amplitude (target amplitude) corresponding to the calculation value (motor current value) is read out from the table 35c. The multiplication (amplification) unit 36 amplifies the constant-amplification current signals ido, iqo to the target amplitude, and outputs these to the addition-subtraction units 41d, 41q. Other constitutions and functions of the third embodiment are identical to the first embodiment described above.

What is claimed is:

1. A sensorless motor control device comprising:
   a magnetic pole position estimating unit that does not use a sensor to detect a magnetic pole position of a motor having a salient rotor, and overlays a high-frequency current on the motor to estimate the magnetic pole position of the rotor of the motor; and
   a high-frequency current control unit for changing a magnitude of the high-frequency current based on a magnitude of one of a torque or a current of the motor,
   wherein the high-frequency current control unit includes a high-frequency generating unit for generating a high-frequency current signal; a table that is a collection of current level specification data that correspond to each value of one of the torque or the current of the motor; and a unit for generating the high-frequency current by amplifying the high-frequency current signal to a level specified by the current level specification data in the table that corresponds to one of the present torque and current.

2. The sensorless motor control device according to claim 1, wherein
   the current level specification data in the table is amplitude specification data, and
   the high-frequency current control unit generates a high-frequency current command value by amplifying an amplitude of the high-frequency current signal to an amplitude specified by the amplitude specification data.

3. The sensorless motor control device according to claim 1, wherein
   the current level specification data in the table is gain specification data, and
   the high-frequency current control unit generates a high-frequency current command value by amplifying the high-frequency current signal using a gain specified by the gain specification data.

* * * * *